United States Patent [19]

Huver et al.

[11] Patent Number: 5,478,427
[45] Date of Patent: Dec. 26, 1995

[54] NEW REACTIVE CONTACT ADHESIVES, A PROCESS FOR THEIR PRODUCTION AND THEIR USE

[75] Inventors: Thomas Huver, Duesseldorf; Winfried Emmerling, Neuss; Michael Kux, Monheim; Christian Nicolaisen, Ronnenberg; Wolfgang Klauck, Meerbusch, all of Germany

[73] Assignee: Henkel Kommanditgesellschaft auf Aktien, Duesseldorf, Germany

[21] Appl. No.: 81,249

[22] PCT Filed: Dec. 6, 1991

[86] PCT No.: PCT/EP91/02339

§ 371 Date: Jun. 24, 1993

§ 102(e) Date: Jun. 24, 1993

[87] PCT Pub. No.: WO92/11335

PCT Pub. Date: Jul. 9, 1992

[30] Foreign Application Priority Data

Dec. 24, 1990 [DE]  Germany ............... 40 41 753.0

[51] Int. Cl.$^6$ ............... B32B 31/00; C09J 5/04; C09J 175/16
[52] U.S. Cl. ............... 156/273.3; 156/275.5; 156/275.7; 156/307.5; 156/331.4
[58] Field of Search ............... 526/301; 427/385.5; 156/273.3, 275.5, 275.7, 307.5, 331.4

[56] References Cited

U.S. PATENT DOCUMENTS

| | | | |
|---|---|---|---|
| 4,174,307 | 11/1979 | Rowe et al. | 204/159.19 |
| 4,242,488 | 12/1980 | Stanley et al. | 428/423.1 |
| 4,818,804 | 4/1989 | Kuriyama et al. | 526/211 |
| 4,820,745 | 4/1989 | Müller et al. | 522/90 |
| 4,822,829 | 4/1989 | Müller et al. | 522/90 |
| 4,861,853 | 8/1989 | Petrie et al. | 526/302 |
| 5,013,631 | 5/1991 | Su | 430/271 |
| 5,098,788 | 3/1992 | Petrie et al. | 428/394 |

FOREIGN PATENT DOCUMENTS

| | | |
|---|---|---|
| 0108630 | 5/1984 | European Pat. Off. . |
| 0194360 | 9/1986 | European Pat. Off. . |

OTHER PUBLICATIONS

S. Peeters et al. "Overview of Dual Cure Possibilities in UV Coatings", Polymers Paint Colour Journal 179 (1989), 304–309.

Primary Examiner—Joseph L. Schofer
Assistant Examiner—Wu C. Cheng
Attorney, Agent, or Firm—Wayne C. Jaeschke; John Daniel Wood; Daniel S. Ortiz

[57] ABSTRACT

New contact adhesives which are designed as multifunctional contact reactive adhesives and which may be used in a multistage curing process, for example for bonding wood, plastic moldings, metals and the like, are provided. One of the functional substituents of the adhesive composition is characterized by the presence of an olefinic double bond which is accessible to radical reaction initiation. The other functional substituent is an isocyanate group which reacts off, e.g. under the effect of moisture. These different reaction mechanisms enable the reactive contact adhesive to be cured in stages, e.g. by forming contact-sensitive adhesive layers on hard surfaces in a first stage, subsequently fitting the correspondingly coated surfaces together and firmly bonding them together in a final stage, e.g. under the effect of atmospheric moisture. Also provided is a process for the production of the new reactive contact adhesives.

27 Claims, No Drawings

NEW REACTIVE CONTACT ADHESIVES, A PROCESS FOR THEIR PRODUCTION AND THEIR USE

BACKGROUND OF THE INVENTION

1. Field of the Invention

This invention relates to new contact adhesives which are designed as multifunctional contact reactive adhesives and which may be used in a multistage curing process, for example for bonding wood, plastic moldings, metals and the like. The invention also relates to a process for the production of the new reactive contact adhesives, describing in particular a class of bifunctionally substituted urethane oligomers for the stated application. One of the functional substituents is characterized by the presence of an olefinic double bond which is accessible to radical reaction initiation. The other functional substituent is an isocyanate group which reacts off, for example, under the effect of moisture. These different reaction mechanisms enable the reactive contact adhesive to be cured in stages, particularly since the reactions involved take place at different rates, which opens up the possibility described in detail hereinafter of forming contact-sensitive adhesive layers on hard surfaces in a first stage, subsequently fitting the correspondingly coated surfaces together and firmly bonding them together in the final stage of the two-stage curing step, more particularly under the effect of atmospheric moisture.

2. Discussion of Related Art

Urethane-based coating materials curing in two stages have been described in various embodiments, cf. for example S. Peeters et al. "OVERVIEW OF DUAL CURE POSSIBILITIES IN UV COATINGS", POLYMERS PAINT COLOUR JOURNAL 179 (1989), 304–309. This literature reference describes in particular urethane-based dual-cure coating compositions which, in a first cure stage, can be cured through the presence of UV-curable acrylate groups to form a firm, but still stucturally formable or compressible material which is irreversibly cured in a following second stage. In the processing of these multifunctional materials, particular use can be made of the fact that the reactive acrylate groups can be rapidly cured, for example by UV irradiation, while other groups present in the system, which react to heat and/or moisture, cure comparatively slowly. More specifically, the cited literature reference describes systems curing in two stages by different mechanisms for use in the printing and coating industry. There is no reference to adhesives, especially contact adhesives reacting in stages which correspond to the teaching according to the invention.

EP B1 194 360 describes binders based on epoxy resins which can be crosslinked by irradiation and subsequently cured by heat treatment. More specifically, the document in question describes corresponding binders which are obtained by reaction of an epoxide compound containing more than one epoxide group per molecule with one or more carboxylic acids in a molar ratio of the epoxide groups to the carboxyl groups of 1:0.5 to 0.9 and subsequent reaction of the reaction product with one or more unsaturated isocyanatocarbamate esters which are obtained by reaction of compounds containing at least two isocyanate groups with hydroxy-functional acrylates, methacrylates or cyanoacrylates. These UV-precrosslinkable and thermally post-curing binder systems are said to be used, for example, as etching resists and/or as solder stop lacquers.

EP B1 108 630 describes radiation-curable liquid adhesive compositions for the production of clear glass laminates containing (a) a urethane acrylate component in (b) a liquid alpha,beta-ethylenically unsaturated diluent component containing acrylic acid and a monoester of acrylic acid, the composition optionally including (c) a photoinitiator. The teaching according to this document is characterized by the use of urethane acrylate components obtainable by reaction of a hydroxyl- or isocyanate-terminated oligomeric urethane intermediate product with an alpha,beta-ethylenically unsaturated compound which is reactive to the terminal groups of the intermediate product. If isocyanate groups are present as binding-promoting terminal groups in the end product, they are reacted off to prepare the urethane acrylate components and are therefore removed as reactive groups from the following curing process.

U.S. Pat. No. 4,174,307 describes a comparable reaction mechanism for binding radical-curable acrylate groups to a basic molecule via free isocyanate groups intermediately present on that basic molecule. In this case, too, starting components polyfunctionally substituted by isocyanate groups are reacted with acrylate compounds which, in addition to their radical-reactive olefinic double bond, contain a reactive hydrogen atom (as determined by the known zerewitinoff method) which leads to addition of the acrylate component onto the free isocyanate group. Active hydrogen atoms of this type are made available in particular by hydroxyl groups of acrylate monomers, although other H-active substituents, such as mercapto, imino, amino, carboxyl, carbamoyl, sulfo, sulfonamido, thiocarbamoyl groups and similar groups are suitable as potentially isocyanate-reactive groups for binding the acrylate units. According to the teaching of this document, all the isocyanate groups present in the intermediate product are supposed to be completely reacted with the reactive acrylate compounds so that polyfunctional acrylate urethane oligomers with no free isocyanate groups are formed. Various applications are proposed for the polyfunctional components of this type, including their use as adhesives.

Finally, U.S. Pat. No. 4,820,745 describes pressure-sensitive contact adhesives free from solvents and other volatile constituents, such as unsaturated monomers, based on selected polyesters of which the free hydroxyl groups are partly reacted off with acrylate or methacrylate compounds. In this case, too, free isocyanate groups inter alia may be used as reactive intermediates for binding the acrylate or methacrylate units, but are subsequently destroyed during the binding of those parts of the molecule which contain reactive acrylate groups. In addition, the document in question again relates to permanently pressure-sensitive contact adhesives and not to reactive contact adhesives corresponding to the teaching according to the present invention.

DESCRIPTION OF THE INVENTION

In a first embodiment, the present invention relates to reactive contact adhesives based on polyfunctional macromonomer compounds curable by different reaction mechanisms—hereinafter referred to as "polyfunctional macromers"—which may even be present in admixture with components reacting in a single stage. The reactive contact adhesives according to the invention are characterized in that they contain substituted urethane oligomer compounds bearing moisture-curing isocyanate groups in addition to olefinically unsaturated radical-reactive substituents as the polyfunctional macromers.

The polyfunctional macromers which are described in more detail hereinafter are generally present in the contact adhesive together with other reactive mixture components, of which two differently reactive types are particularly important, namely: preferably radical-curable reactive diluents and moisture-reactive isocyanate compounds acting as plasticizers and/or cross-linkers.

In another embodiment, the invention relates to a process for the production of the new contact adhesive mixtures curable in several stages. Finally, in another embodiment, the invention relates to the use of the contact adhesives for the bonding, particularly the surface-to-surface bonding, of hard materials, for example wood, plastics and/or metal. Particulars of the teaching according to the invention The teaching according to the invention is based on the following processing concept for the application of the new contact adhesives:

The moldings to be joined should be coated with the contact adhesives—liquid or paste-like and spreadable at the application temperature—in a predetermined layer thickness, material-saving, comparatively thin layers of adhesive being preferable. The adhesive layers are then subjected to a first curing stage by radical reaction initiation and, in particular, by exposure to UV radiation. The adhesive material now cured and hence fixed on the surface of the molding should have two properties crucial to the further processing cycle. On the one hand, it is required to show sufficient contact tackiness when the correspondingly coated surfaces are fitted together so that sufficient bond strength for subsequent processing can be achieved simply by applying pressure. On the other hand, however, the adhesive layer is also required to be reactive to moisture so that the two layers of adhesive in contact with one another cure by chemical reaction with one another to form the three dimensionally cross-linked adhesive layer, particularly under the effect of atmospheric moisture in the assembled, for example two-layer, molding.

Three main components of the contact adhesive mixture are particularly important for carrying out this concept, namely the polyfunctional macromer, the preferably radical-curable reactive diluents and moisture-reactive plasticizing and/or crosslinking isocyanate compounds additionally present in the mixture.

The polyfunctional macromers

As already mentioned, the polyfunctional macromers are characterized in that, in addition to olefinically unsaturated radical-reactive substituents, they contain moisture-curing isocyanate groups on a urethane oligomer basic component. These polyfunctional macromers are preferably based on urethane oligomers having an at least predominantly linear basic structure. As functional groups, they contain on the one hand the olefinically unsaturated substituents, more particularly the UV-curing olefinically unsaturated substituents, and in addition free isocyanate functions as the other reactive substituents. In the preferred embodiment, these two reactive substituents are arranged at least partly and, in particular, predominantly spatially separate from one another on the urethane oligomer in the structure of the molecule.

In another preferred embodiment, the multifunctional macromer compounds are at least predominantly functionalized only once with the radical-reactive olefinically unsaturated substituent per molecule unit, so that the buildup of linear reaction chains to form so-called comb polymers and not three-dimensional crosslinking is promoted in the first curing stage.

In general, a considerable number of the polyfunctional macromers will also contain only one isocyanate groups in the particular molecule in question. However, in view of the crosslinking which the adhesive is intended to undergo in the second stage of the reaction, it is clear that, so far as this reactive group is concerned, more than only one isocyanate group may of course be present—proportionally at least—at the mixture component of the contact adhesive which is being described here.

In one preferred embodiment of the invention, the two reactive groups of the olefinically reactive substituent and the isocyanate group are situated in the alpha,omega-position on the urethane oligomer molecule in the polyfunctional macromers. This spatial separation is readily achieved in the production of the polyfunctional macromers. In this embodiment, they are derived to at least a substantial degree from intermediately formed isocyanate-terminated urethane oligomers and, more particularly, from bifunctional components, i.e. diols and diisocyanates. Accordingly, a urethane oligomer terminated by isocyanate groups is formed as an intermediate reaction product. One of these isocyanate groups is reacted in known manner (for example in accordance with the above-cited particulars of the relevant literature) by means of a radical-polymerizable monomer compound containing reactive hydrogen so that, in the molecule now present, the radical-reactive olefinic group is present in addition to the terminal isocyanate group which has remained intact at the other end of the molecule.

It has been found that the nature and quantity of the basic constituents forming the oligourethanes can be crucial to establishment of the contact tackiness temporarily required during processing. Thus, polyfunctional macromers of the described structure, in which the basic urethane oligomer has molar ratios of diol to diisocyanate of 1:1.2 to 2 and preferably 1:1.4 to 1.8, are preferred for the purposes of the invention. Polyurethane oligomers, which have statistical mean values of the order of 1:1.5 for this diol to diisocyanate ratio, can be particularly suitable for meeting the complex product requirements. At the same time, it has been found that there are also preferred upper limits to the maximum molecular weights of the basic urethane oligomers. In general, the molecular weights of these components will be no higher than about 35,000 and, preferably, no higher than at most about 20,000. Particularly suitable polyfunctional macromers can be obtained from urethane oligomers having molecular weights in the range from about 1,000 to 3,000.

In the preferred embodiment, polyols, particularly diols, having selected molecular weight ranges are used in addition to the usual aromatic, aliphatic and/or cycloaliphatic polyisocyanates, particularly corresponding diisocyanates, for the production of the urethane oligomers. For example, short-chain polyester diols and/or corresponding polyether diols having maximum molecular weights of approximately 6,000 and, preferably, of at most about 1,000 are particularly suitable reactants for the production of the urethane oligomers. In general, the minimum molecular weight of the diol components to be used is at least about 100, the use of diol components having molecular weights in the range from about 230 to 700 having proved to be particularly effective. It is precisely through the choice of the diol component that a significant influence can be exerted in accordance with the invention on the properties of the contact adhesives in the various stages of their processing and application.

Examples of suitable organic diisocyanates for the production of the urethane oligomers from the particularly suitable classes of aromatic, aliphatic and/or cycloaliphatic diisocyanates are, in particular, commercially available products, such as 2,4- and/or 2,6-tolylene diisocyanate, m-phenylene diisocyanate, xylylene diisocyanate, 4,4'-biphenylene diisocyanate, 1,4-tetramethylene and/or 1,6-hexamethylene diisocyanate, 1,4-cyclohexylene diisocyanate, 1,5-tetrahydronaphthalene diisocyanate, methylene dicyclohexylene diisocyanate and the like.

Preferred diol components having molecular weights in the ranges mentioned above are, for example, low molecular weight polyesters of aliphatic and/or aromatic dicarboxylic acids, such as adipic acid and isophthalic acid, and diols, such as hexanediol, neopentyl glycol and/or 1,2-propylene glycol. Suitable polyether diols are, for example, corresponding polyalkylene glycols, more particularly polypropylene glycol, polycyclic ether diols and the like.

Within the ranges mentioned above for the quantity ratios of the isocyanate compounds on the one hand and the polyfunctional alcohol components on the other hand, the isocyanate-terminated lower urethane oligomers are formed as intermediates. They are reacted with less than the stoichiometrically necessary quantity of monomeric acrylate components which, for their part, are distinguished by the presence of an active hydrogen atom and hence by their reactivity to the isocyanate group, cf. for example U.S. Pat. No. 4,174,307 cited above. Accordingly, the reaction may be carried out, for example, at temperatures of up to about 95° C. and preferably in an inert gas atmosphere for the addition of the H-active vinyl compounds to the urethane oligomers containing free isocyanate groups introduced beforehand.

Although, basically, any corresponding vinyl compounds may be used for this reaction, corresponding esters of acrylic acid and/or methacrylic acid—hereinafter referred to as (meth)acrylates—are used in a preferred embodiment of the invention. When they react off, substituents of this type show only a slight tendency towards crosslinking initiated by transfer reactions and, at the same time, a high polymerization rate. In the context of radiation curing, this means that comparatively short exposure times may be used in the first curing stage. Corresponding esters containing a hydroxyl group in the ester-forming alcohol function of the (meth)acrylate molecule are particularly suitable for the partial reaction of the terminal isocyanate groups on the urethane oligomer molecule with the (meth)acrylates. A characteristic example of esters such as these is hydroxyethyl acrylate or methacrylate.

Theoretically, one isocyanate group may be converted into an acrylate group at each molecule of the isocyanate-terminated urethane oligomers intermediately formed for the production of the polyfunctional macromers. However, if the macromers obtained with corresponding stoichiometric quantities of the reactants are used in accordance with the invention, slightly hard and insufficiently contact-tacky films are formed in the first stage of the light curing process. In fact, a corresponding reaction product contains statistically high levels of diacrylates which, in the light curing stage, form partly crosslinked polymers which, after application to the substrates to be joined, form adhesive films that are difficult to press-mold because the molecular structure can no longer be sufficiently penetrated during press-molding. In a preferred embodiment of the invention, therefore, less than the stoichiometrically possible amount of 50% of the total free isocyanate groups present is converted into (meth)acrylate groups in the production of the polyfunctional macromers and hence in the production of new contact adhesives. Preferably only about 15 to 35% and, more preferably, 20 to 30% of the isocyanate-terminated oligourethane starting materials intermediately formed are converted into the monoolefinic substituents. This procedure has a twofold effect, namely:

The statistical formation of the unwanted diacrylate urethanes is suppressed; at the same time, a corresponding percentage of purely isocyanate-terminated urethane oligomers remains intact. This oligomeric diisocyanate component acts as a reactive plasticizer for the contact-sensitive adhesive films formed in the first curing stage and hence leads to readily press-moldable adhesive layers. At the same time, the functionality of the adhesive for the second curing step involving exposure to water or atmospheric moisture is increased as, hence, is the strength of the bond ultimately formed. This is clearly another advantage so far as the production of the adhesive mixtures according to the invention is concerned. The mixture of the asymmetrically reactive prepolymer and the symmetrical diisocyanate plasticizer can be obtained in a convenient one-pot synthesis.

Other purely isocyanate-reactive mixture components

According to the specific constitution of the urethane oligomer (for example in dependence upon the particular constitution selected for the diol component) the cured adhesives show characteristic values for the heat resistance of the fully cured adhesive after radical curing and subsequent water curing. If these values are undesirably low, they may be improved by using isocyanate components having a functionality of more than 2. It is particularly suitable in this case to use trifunctional isocyanate-terminated mixture components which may be obtained in known manner by the use of corresponding higher alcohols in the urethanization reaction. The percentage content of these relatively high-functionality polyisocyanate compounds can be adapted to meet particular requirements; in general, the at least trifunctional isocyanate components will not exceed the quantity of diisocyanate components present as reactive plasticizers to a significant extent, if at all.

Olefinically unsaturated reactive diluents

In addition to the components mentioned thus far, so-called reactive diluents, which are reactive to the radical reaction initiation stage, are also used in preferred adhesives according to the invention. The reactive diluents are preferably low-volatility, isocyanate-free monofunctional components which are liquid at room temperature, corresponding monofunctional (meth)acrylate compounds again being particularly important. It is possible through the physical quality of the reactive diluents to influence the working conditions under which the contact adhesives are applied to the hard surfaces to be bonded. Thus, the contact adhesives can be made available as free-flowing and/or paste-like spreadable compositions at temperatures around room temperature or at only moderately elevated temperatures (for example up to an upper temperature limit of around 70° C.) so that thin layers of predetermined thickness can be reliably formed.

It is important that these reactive diluents are also olefinically monofunctional reactants in order to rule out the unwanted effects mentioned above of crosslinking during the first light curing stage. Reactive diluents of the described type which are capable of forming homopolymers having glass transition temperatures below room temperature are particularly preferred, monomers of which the polymers formed in the homopolymerization reaction have glass transition temperatures well below 0° C. being particularly suitable. (Meth)acrylates of sufficiently limited volatility, for example n-butyl acrylate, or esters of higher linear or branched alcohols satisfy this requirement profile.

The mixing ratios of the adhesive components

Preferred adhesive compositions according to the invention contain the components mentioned in the following quantities, based on the adhesive as a whole:

polyfunctional macromer compounds: 5 to 90% by weight, preferably 10 to 60% by weight and more preferably 20 to 50% by weight radical-curable reactive diluent: 10 to 80% by weight and preferably 20 to 50% by weight isocyanate compounds free from radical-curable substituents: 10 to 60% by weight and preferably 20 to 50% by weight.

Where trifunctional and/or more than trifunctional isocyanates are used in this component of the mixture, they may be present in a percentage by weight of, for example, up to 50% by weight, preferably up to 30% by weight and, more preferably, approximately 5 to 20% by weight.

By suitably selecting the components of the mixture and their percentage contents, it is possible to form mixtures which are liquid to paste-like and spreadable at the application temperature, but which at the same time are free from non-reactive solvents and/or plasticizers.

The adhesive mixtures preferably contain small quantities of inhibitors to prevent premature radical initiation of polymerization, as known per se. Methods known per se are also used for the radical initiation of the first curing stage. Suitable initiators are, for example, redox initiators providing adequate curing is not restricted or inhibited by the effect of air. As repeatedly mentioned in the foregoing, radiation curing, preferably UV curing, is preferred for the first curing stage. Accordingly, the adhesive mixtures best contain small quantities of activators to initiate radiation curing, as known per se (cf. the relevant literature cited at the beginning).

Characteristic embodiments of the production of the new contact adhesives, their use in the bonding of wood and PVC moldings and the results obtained in performance tests are summarized in the following Examples.

EXAMPLES

Examples 1 to 4 below describe the production of a polyfunctional macromer corresponding to the definition according to the invention, i.e. the production of typical representatives of the class of urethane oligomer compounds which contain a moisture-curing isocyanate group in addition to an olefinically unsaturated, radical-reactive substituent.

Example 5 below describes the production of a trifunctional isocyanate compound used as a component in the adhesive mixtures described in Examples 6 to 14.

Another adhesive mixture is described in Example 15.

Example 15 is followed by a description of the procedure for bonding with the adhesive mixtures according to the invention, the tensile shear strengths (N/mm$^2$) of bonds formed with the adhesives according to Examples 6 to 15 being set out in tabular form.

Production of the isocyanate-functional polyurethane acrylates, Examples 1 to 4

Example 1

321 g polypropylene glycol (molecular weight 400) are heated to 50° C. 281g 4,4'-diisocyanatopdiphenyl methane (MDI, "Desmodur 44 M", a product of Bayer AG) are then added in portions and the mixture is subsequently heated for 2.5 h to 80° C. until the theoretical NCO content of 5.2% is reached. 21.6 g 2-hydroxyethyl acrylate are then added and the reaction mixture is heated for another 30 minutes to 75° C. The residual NCO content is 3.82%. The prepolymer may be stored in the absence of moisture or may be directly incorporated in an adhesive formulation.

Example 2

232 g of a diol based on polytetrahydrofuran ("PolyTHF 50", a product of BASF) are heated to 60° C. and 131 g hydrogenated MDI ("Desmodur WE", a product of Bayer AG) are added. The mixture is then heated for 4 h to 100° C., the NCO content falling to 0%. 174 g 2,4-tolylene diisocyanate (MDI, "Desmodur T 100", a product of Bayer AG) are then added at 80° C., the temperature of 80° C. being maintained until the theoretical NCO content of 6.34% is reached. 0.056 g hydroquinone monomethyl ether and 28.7 g 2-hydroxyethyl acrylate are then added, followed by heating for 45 minutes to 80° C. The prepolymer thus obtained has an NCO content of 4.6%.

Example 3

A prepolymer is prepared as in Example 1 from 400 g polyester diol ("PE 216", a product of Henkel KGaA) 187 g MDI and 14.4 g 2-hydroxyethyl acrylate. The prepolymer has an NCO content of 2.6%.

Example 4

A prepolymer having an NCO content of 5.6% is prepared as in Example 2 from 232 g of the commercial product "PolyTHF 250", 125 g MDI, 174 g TDI and 28.7 g 2-hydroxyethyl acrylate.

Example 5

Preparation of a trifunctional isocyanate compound 270 g of an oligocaprolactone triol ("CAPA 305", a product of DOW) are heated to 50° C. 261 g TDI are then added dropwise at such a rate that the reaction temperature does not exceed 80° C. The reaction mixture is heated for another 30 minutes to 80° C. to reach the theoretical NCO content of 11.9%.

Example 6

Preparation of an adhesive mixture 34 g 3-methoxybutyl acrylate are heated to 50° C. 1 g of a photoinitiator ("Irgacure 651", a product of Ciba Geigy), 60 g of the prepolymer of Example 2 and 5 g of the trifunctional isocyanate compound of Example 5 are then added in the absence of light, followed by stirring to form a homogeneous solution. In the interests of better processability, the prepolymer and triisocyanate are also heated to 50° C. The adhesive mixture thus obtained is stored in the absence of light and moisture and, in this form, is stable in storage at room temperature.

Example 7 to 14

The other adhesive mixtures summarized in the following Table are prepared in the same way as described in Example 6. In the last column, the particular acrylate used is identified by its alcohol radical. The figures in brackets indicate the quantity of components used in the starting formulation of Example 6 both for the prepolymers and for the acrylates.

| Example | Prepolymer acc. to Example (quantity in g) | Acrylate (quantity in g) |
| --- | --- | --- |
| 7 | 4 (70) | 2-Ethylhexyl (29) |
| 8 | 4 (75) | 3-Methoxybutyl (24) |

-continued

| Example | Prepolymer acc. to Example (quantity in g) | Acrylate (quantity in g) |
|---------|---------------------------------------------|--------------------------|
| 9       | 4 (62.5)                                    | 2-Phenoxyethyl (36.5)    |
| 10      | 1 (70)                                      | 3-Methoxybutyl (29)      |
| 11      | 1 (70)                                      | n-Butyl (29)             |
| 12      | 1 (70)                                      | Benzyl (29)              |
| 13      | 1 (70)                                      | 2-Methoxypropyl (29)     |
| 14      | 3 (70)                                      | 2-Phenoxyethyl (29)      |

Example 15

An adhesive mixture is prepared in the same way as described in Example 8, except that "Lucirin TPO", a product of BASF, is used as the photoinitiator in a concentration of 1% by weight.

Bonding procedure

The adhesive mixture obtained in accordance with Example 6 is knife-coated in a layer thickness of 0.1 mm onto beech plywood test specimens measuring 80×50×4 mm. It is then exposed for 5 minutes to the light of a 300 W photolamp (Osram Vitalux) to produce a contact-sensitive layer. The coated parts are joined together with an overlap of 1000 mm² and subjected to a pressure of 0.5N/mm² for 60 minutes. Other light sources, for example high-pressure Hg lamps (Köhler Ultrajet 100), may also be used. The exposure times should be adapted to the light sources. The tensile shear strengths are measured at a crosshead speed of 100 mm/min. after 2 minutes (initial strength) and 7 days (final strength) using a Zwick 144501/00 testing machine.

Tensile shear strengths (N/mm$_2$) of bonds with adhesive formulations prepared in accordance with Examples 6 to 15

| Example No. | Initial strength | Final strength |
|-------------|------------------|----------------|
| 6           | 1.9              | 7.2            |
| 7           | 0.7              | 8.1            |
| 8           | 2.1              | 8.2            |
| 9           | 0.8              | 8.9            |
| 10          | 1.2              | 6.4            |
| 11          | 1.3              | 7.2            |
| 12          | 0.9              | 7.8            |
| 13          | 2.0              | 8.9            |
| 14          | 0.2              | 6.3            |
| 15          | 1.3              | 4.3            |

We claim:

1. A method of bonding surfaces comprising:
   (a) coating the surfaces to be joined with a composition comprising,
      (i) a substituted urethane oligomer having a moisture-curing isocyanate group and an olefinically unsaturated radical-reactive group,
      (ii) a radical curable diluent; and
      (iii) a moisture reactive isocyanate compound free from radical-curable substituents,
   (b) subjecting the coating composition to a first radical initiation reaction curing step to form a radically cured composition,
   (c) fitting the surfaces coated with the radically cured composition together, and
   (d) allowing the radically cured composition to cure under the effect of moisture.

2. The method of claim 1 wherein said substituted urethane oligomer compound has an at least predominantly linear basic oligomer structure.

3. The method of claim 1 wherein the moisture-curing isocyanate group of said substituted urethane oligomer compound is predominantly spatially separate from the olefinically unsaturated radical-reactive group in the molecular structure.

4. The method of claim 1 wherein said substituted urethane oligomer compound is comprised of at least predominantly monoolefinically substituted and mono- and/or poly-isocyanate-substituted urethane oligomer compounds.

5. The method of claim 1 wherein the olefinic group and isocyanate group of said substituted urethane oligomer compound are predominantly in the alpha,omega-position.

6. The method of claim 1 wherein said substituted urethane oligomer compound is at least partially derived from isocyanate-terminated diol/diisocyanate-based urethane oligomers of which one isocyanate group is reacted with a radical-polymerizable monomer compound containing reactive hydrogen.

7. The method of claim 6 wherein said radical-polymerizable monomer compound is an acrylate or methacrylate compound.

8. The method of claim 1 wherein the urethane oligomers of said substituted urethane oligomer compound have maximum molecular weights of approximately 35,000 and is derived from a mixture with a molar ratio of diol to diisocyanate of 1:1.2 to 2.

9. The method of claim 1 wherein the urethane oligomers of said substituted urethane oligomer compound have maximum molecular weights in the range from 1,000 to 3,000 and is derived from a mixture having a molar ratio of diol to diisocyanate of 1:1.4 to 1.8.

10. The method of claim 1 wherein said substituted urethane oligomer compound is derived from a diol component having molecular weights of at least about 100 to at most about 6,000.

11. The method of claim 1 wherein said substituted urethane oligomer compound is derived from a diol component having molecular weights in the range from about 230 to 700.

12. The method of claim 1 wherein said composition has contact tackiness when applied to a substrate to such an extent that pressure-sensitive bonding of materials is possible.

13. The method of claim 1 wherein the moisture-reactive isocyanate compounds act as plasticizers or crosslinkers.

14. The method of claim 13 wherein said moisture-reactive isocyanate compounds are diisocyanates, optionally in admixture with higher polyisocyanate compounds.

15. The method of claim 13 wherein at least most of said reactive isocyanate mixtures components are urethane oligomer-based diisocyanates present in excess from the production of said substituted urethane oligomer compound.

16. The method of claim 1 wherein said radical-curable diluent is a monofunctional acrylate compound or methacrylate compound, said compound being free from isocyanate groups and being liquid at room temperature.

17. The method of claim 1 wherein, in regard to their radical-reactive functionality, the components of the adhesive mixture are essentially monofunctional compounds.

18. The method of claim 1 wherein, in regard to their moisture-reactive isocyanate functionality, the components of said mixture are a mixture of monofunctional and di-functional compounds.

19. The method of claim 1 wherein the composition is comprised of the individual components of the mixture in the following quantities, based on the weight of the composition as a whole: (a) substituted urethane oligomer compounds in an amount of 5% to 90%, (b) radical-curable reactive diluent in an amount of 10% to 80% and isocyanate compounds free from radical-curable substituents in an amount of 10% to 60% by weight.

20. The method of claim 1 wherein the composition is comprised of the individual components of the mixture in the following quantities, based on the weight of the composition as a whole: (a) substituted urethane oligomer compounds in an amount of 20 to 50%, (b) radical-curable reactive diluent in an amount of 20 to 50%, (c) isocyanate compounds free from radical-curable substituents in an amount of 20% to 50%.

21. The method of claim 1 wherein the composition is liquid to paste-like and spreadable at an application temperature, but are essentially free from non-reactive solvents and/or plasticizers.

22. The method of claim 1 further comprising inhibitors against premature radical polymerization and activators to initiate UV radiation curing.

23. The method of claim 1 wherein said first curing is initiated by exposure to UV light.

24. The method of claim 1 wherein said cure through the moisture-curing isocyanate group is under the effect of atmospheric moisture.

25. The method as claimed in claim 1 wherein said surfaces are of wood and/or plastic parts.

26. The method of claim 1 wherein said surfaces to be coated are at temperatures of up to about 70° C.

27. A method of claim 26 wherein said surfaces to be coated are at about room temperature.

* * * * *